(12) United States Patent
Casebolt et al.

(10) Patent No.: US 10,405,497 B1
(45) Date of Patent: Sep. 10, 2019

(54) SILO GRAIN LEVEL SENSOR SYSTEM

(71) Applicants: Eric Casebolt, Manchester, TN (US); Stephen M. Obsharksy, Jacksonville, FL (US)

(72) Inventors: Eric Casebolt, Manchester, TN (US); Stephen M. Obsharksy, Jacksonville, FL (US)

(73) Assignee: Cell Sign Technologies, Manchester, TN (US)

( * ) Notice: Subject to any disclaimer, the term of this patent is extended or adjusted under 35 U.S.C. 154(b) by 168 days.

(21) Appl. No.: 15/352,678

(22) Filed: Nov. 16, 2016

Related U.S. Application Data

(60) Provisional application No. 62/256,329, filed on Nov. 17, 2015.

(51) Int. Cl.
G01N 21/00 (2006.01)
A01F 25/18 (2006.01)
G01F 23/292 (2006.01)

(52) U.S. Cl.
CPC ........ *A01F 25/183* (2013.01); *G01F 23/2928* (2013.01)

(58) Field of Classification Search
CPC ................... A01F 25/183; G01F 23/2928
USPC ......................................... 356/438
See application file for complete search history.

(56) References Cited

U.S. PATENT DOCUMENTS

| | | | |
|---|---|---|---|
| 4,047,434 A | 9/1977 | Marsh et al. | |
| 4,065,967 A | 1/1978 | Beeston | |
| 4,276,774 A | 7/1981 | McGookin | |
| 4,385,672 A | 5/1983 | Schepel | |
| 5,705,747 A | 1/1998 | Bailey | |
| 5,895,848 A | 4/1999 | Wilson et al. | |
| 6,608,491 B2 | 8/2003 | Salmon, Jr. | |
| 6,732,580 B2 | 5/2004 | Dirksen | |
| 7,111,510 B2 | 9/2006 | Tadoa et al. | |
| 7,971,481 B2 | 7/2011 | Knierim et al. | |
| 8,581,734 B2 | 11/2013 | Ozamez Fortis | |
| 9,743,636 B1* | 8/2017 | Casebolt | A01K 1/0047 |
| 2009/0094853 A1* | 4/2009 | Noyes | F26B 9/103 34/233 |
| 2014/0157889 A1 | 6/2014 | Eakin | |

* cited by examiner

*Primary Examiner* — Sunghee Y Gray

(74) *Attorney, Agent, or Firm* — Patterson Intellectual Property Law, P.C.; Gary L. Montle

(57) ABSTRACT

A system and method for remotely managing grain levels in one or more silos includes a computer system communicatively connected to one or more light sensors and grain loading drive mechanisms and/or grain supply reordering modules. When a sensor reports that a grain level has fallen below a predetermined threshold, the computer system generates an alert and forwards the alert across a wireless communications network to a user's mobile device. The user may select a user command to send to the computer system, whereupon the computer system may activate one or more grain loading drive mechanisms and/or reorder grain from the associated supplier in accordance with the response action or alternatively override the user command based upon one or more contextual determinations, the grain loading drive mechanisms able to replenish the grain levels to optimal, above-threshold levels.

10 Claims, 17 Drawing Sheets

SILO GRAIN LEVEL SENSOR SYSTEM

CROSS-REFERENCES TO RELATED APPLICATIONS

This application claims benefit of U.S. Provisional Patent Application No. 62/256,329, filed Nov. 17, 2015, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE DISCLOSURE

The present disclosure relates generally to improving monitoring and detection of content levels in a silo. More particularly, the present disclosure relates to monitoring and detection of grain levels in silos.

It can be difficult to quickly and easily ascertain the level of grain in a silo. Many times, a farmer or other worker may be forced to scale the silo and look in from the top in order to determine how much grain is left in the silo. Other methods have been developed to make this task less difficult, but such methods can be unreliable and expensive.

Therefore, what is needed is a system for monitoring grain levels in a silo that will remotely notify the user via wireless communications channels of various levels of grain in the silo. The system may be an automated notification and refill request system in some embodiments. Over ninety-five percent of farmers carry cellular devices or have an Internet-connected computer system. As such, a grain level detection system of this type would provide farmers a low-cost method to manage their supply of grains or other goods.

BRIEF SUMMARY OF THE DISCLOSURE

In accordance with a particular aspect of the present disclosure, a computer system is communicatively connected to one or more grain detection sensors capable of determining a level of grain in a silo.

When the grain levels drop below a certain threshold as stored upon the computer system, the computer system will generate an alert and send said alert via a modem and across a communications network to a user's wireless computing device.

In some embodiments, the user may respond to the alert via the wireless computing device and send instructions to the computer system for engaging one or more commands.

In one embodiment of the disclosure, a system for remotely monitoring content levels in a container may include a sensor system disposed on the side of the container comprising at least one light sensor. The sensor system may be communicatively connected to a controller to direct performance of operations including monitoring a level of the contents in the container with the at least one sensor apparatus, comparing the monitored level to a predetermined level threshold, and for monitored levels below the predetermined level threshold, generating and forwarding an alert by means of a wireless communications network to a user's mobile device.

In another embodiment, the at least one sensor apparatus may include a housing including a mounting portion, a light source member extending from the mounting portion, and a sensor member extending from the mounting portion. At least one light source may be disposed on an end of the light source member opposite the mounting portion. At least one light sensor may be disposed on an end of the sensor member opposite the mounting portion. The light sensor may be configured to receive and monitor light from the light source. At least one of the light source and the light sensor may be configured to be covered by the contents of the container when the contents reach a corresponding level.

DETAILED DESCRIPTION OF THE DISCLOSURE

Figure 1:
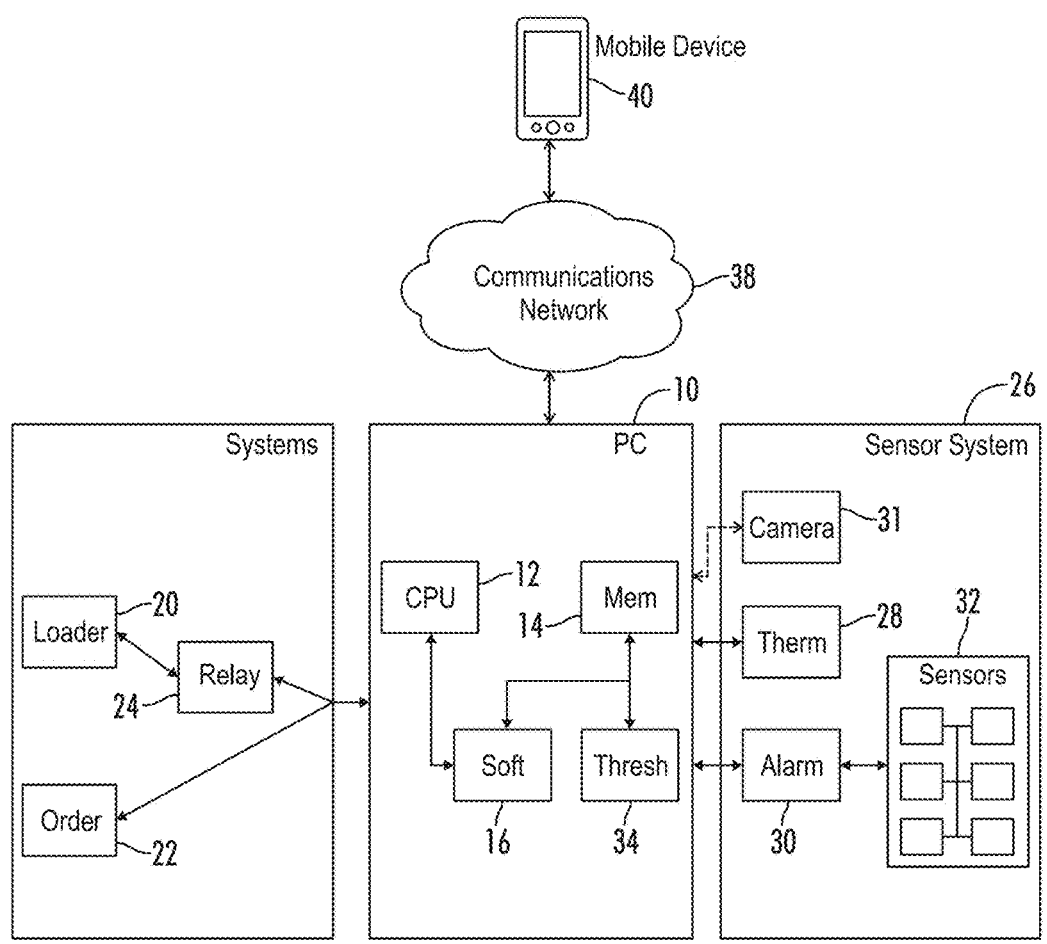
FIG. 1 is a block diagram representing an embodiment of a silo level monitoring system in accordance with the present disclosure.
Figure 2:
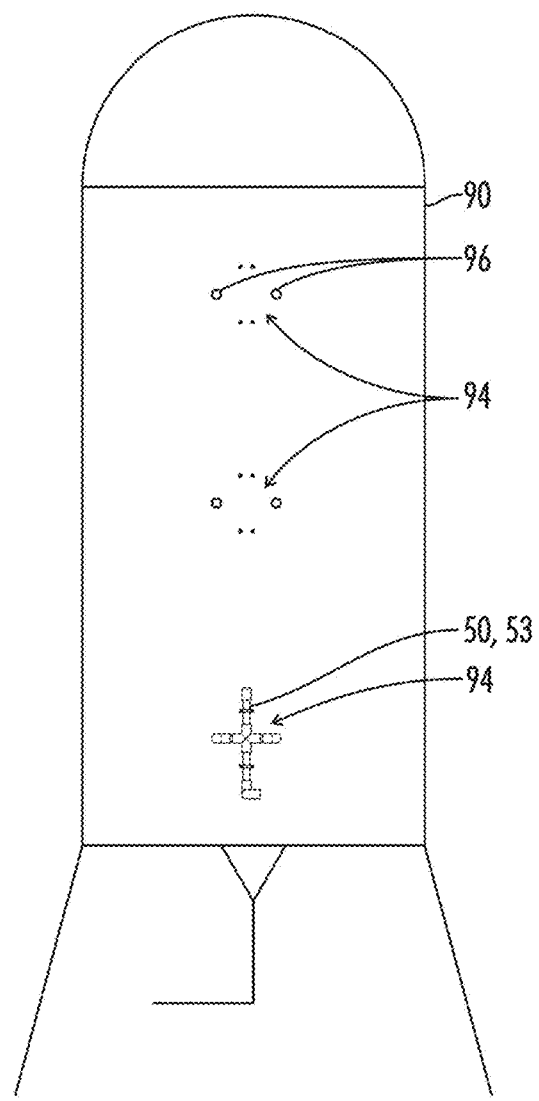
FIG. 2 is a side view of a silo with an embodiment of a sensor apparatus to be used with the monitoring system of FIG. 1.

Referring generally to FIGS. 1-17, various exemplary embodiments of an invention may now be described in detail. Where the various figures may describe embodiments sharing various common elements and features with other embodiments, similar elements and features are given the same reference numerals and redundant description thereof may be omitted below. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The term "silo" as used herein, unless otherwise stated, means any building, structure, bounded area, place, container, tank, and the like, where one or more contents may be substantially contained in one area substantially separate from one or more contents of another area.

The term "grain" as used herein, unless otherwise stated, means any combination of one or more goods or contents to be contained in a silo. Grain may include corn, wheat, soy beans, any other variety of seed, bean, legume, and the like. Grain could also mean non-food contents for a container such as any liquid or solid that may be stored for later use.

The terms "atmosphere" and "atmospheric" as used herein may, unless otherwise stated, mean any ambient condition or conditions relevant to the associated sensor or sensors.

The terms "grain loading drive mechanism" means, unless otherwise stated, any mechanical system capable of transporting grain from a first area to a second area. The term may include screw conveyors, belt conveyors, pressure or vacuum transfer, and the like.

FIG. 1 is an embodiment of a grain level monitoring system for a silo in accordance with the present disclosure. An exemplary computer system 10 may include a central processing unit 12 and a memory medium 14 with one or more program modules 16 stored thereupon, and serves as a control system for one or more alert and/or action systems. In an embodiment, the computer system 10 may be operatively connected to action systems such as a grain loading drive mechanism 20 by means of one or more relays 24 and a grain ordering module 22. The grain ordering module 22 may be embodied as an automated telephone call, an automatic internet order, or some other configuration effective to indicate to a grain supplier the request for more grain.

The computer system 10 may further be operatively connected to one or more sensor systems 26, including for example an air temperature thermometer 28 and an alarm system 30. The one or more sensor systems 26 may be connected to the computer system 10 by wired or wireless communications means. The sensor system may utilize any appropriate equipment to transfer data including Ethernet cable, fiber optic cable, and the like. Other sensor systems may be contemplated for the measurement of grain characteristics and other atmospheric conditions. For example, other sensor systems may be used to measure for moisture, weight, and the like. Still further sensor systems may include digital photography or videography equipment such as a web camera 31 capable of capturing digital video or picture feed of the silo interior or exterior. The one or more sensors may be configured to prevent ignition, such as, for instance a sealed sensor system so as to avoid dust explosions. The sensor system may further accordingly be configured for secure monitoring use in applications having liquid substances as well as high dust levels. The sensor system may further be configured to detect leaks in double wall tanks where a leak may not be evident from a visual inspection of the exterior of the tank.

Figure 3:
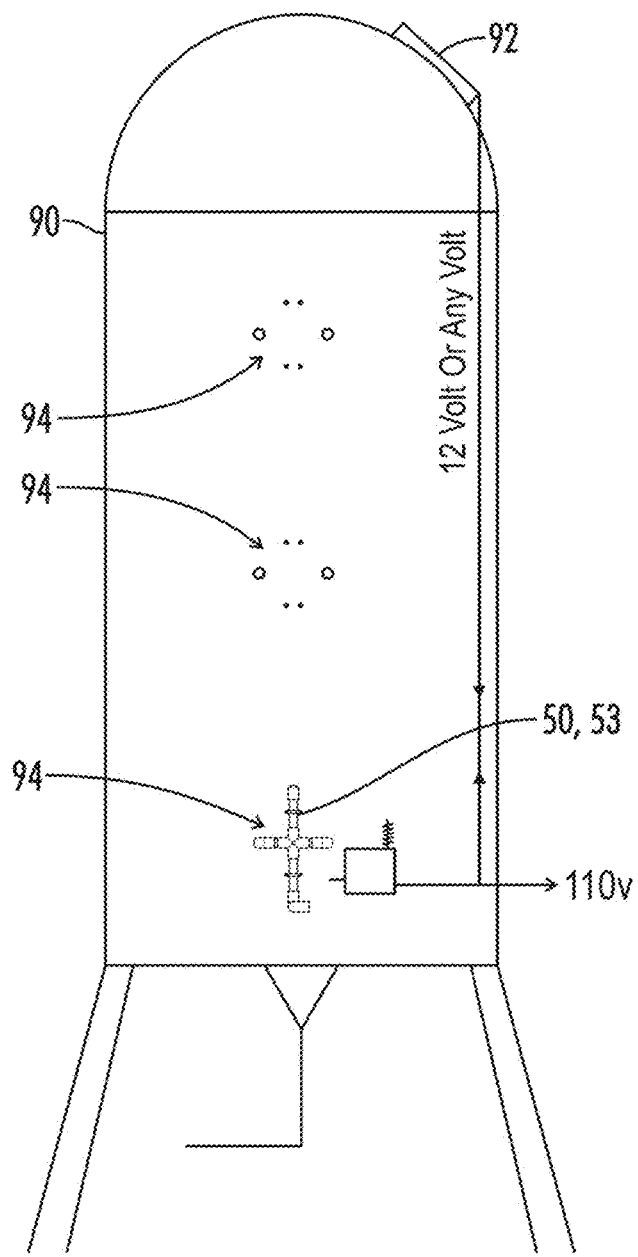
FIG. 3 is a side view of a silo with another embodiment of a sensor apparatus to be used with the monitoring system of FIG. 1.
Figure 4:
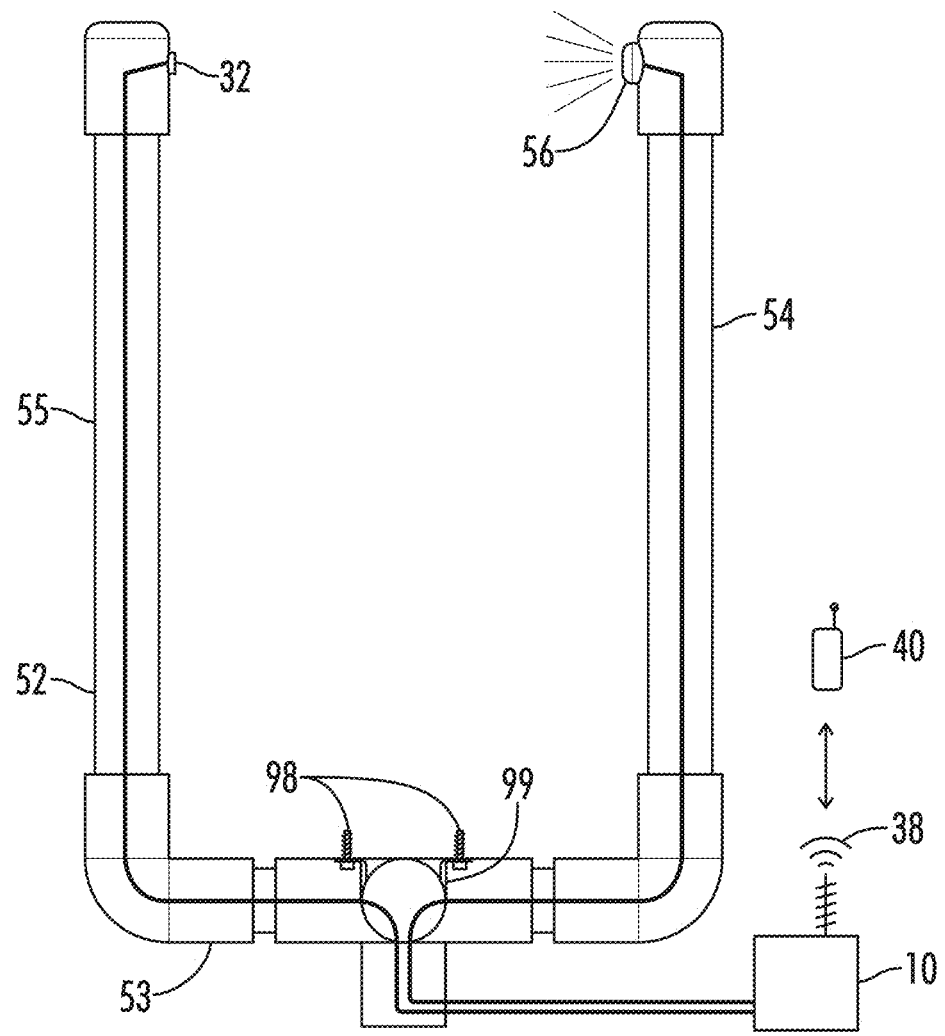
FIG. 4 is a cross-sectional view of the sensor apparatus of FIG. 2.
Figure 5:
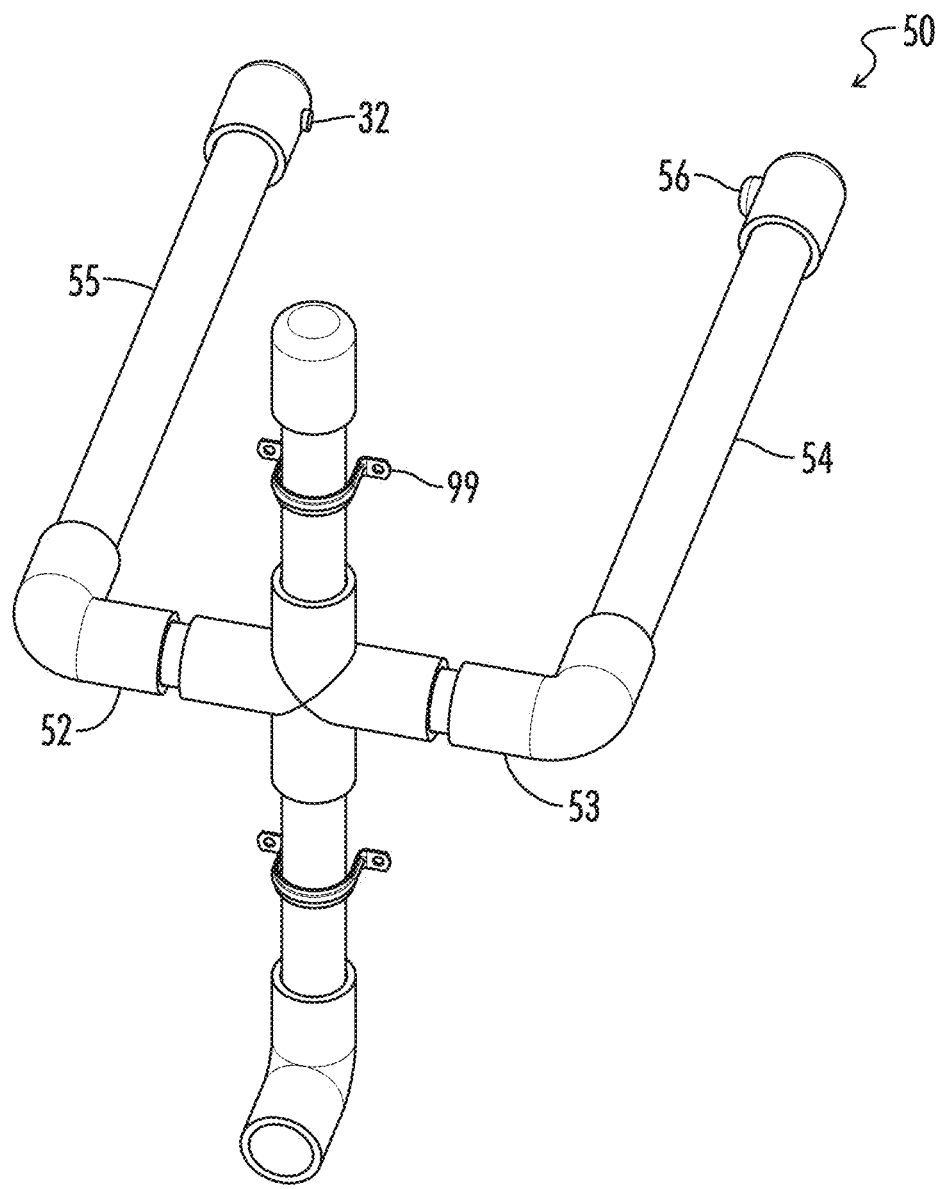
FIG. 5 is a perspective view of the sensor apparatus of FIG. 2.
Figure 6:
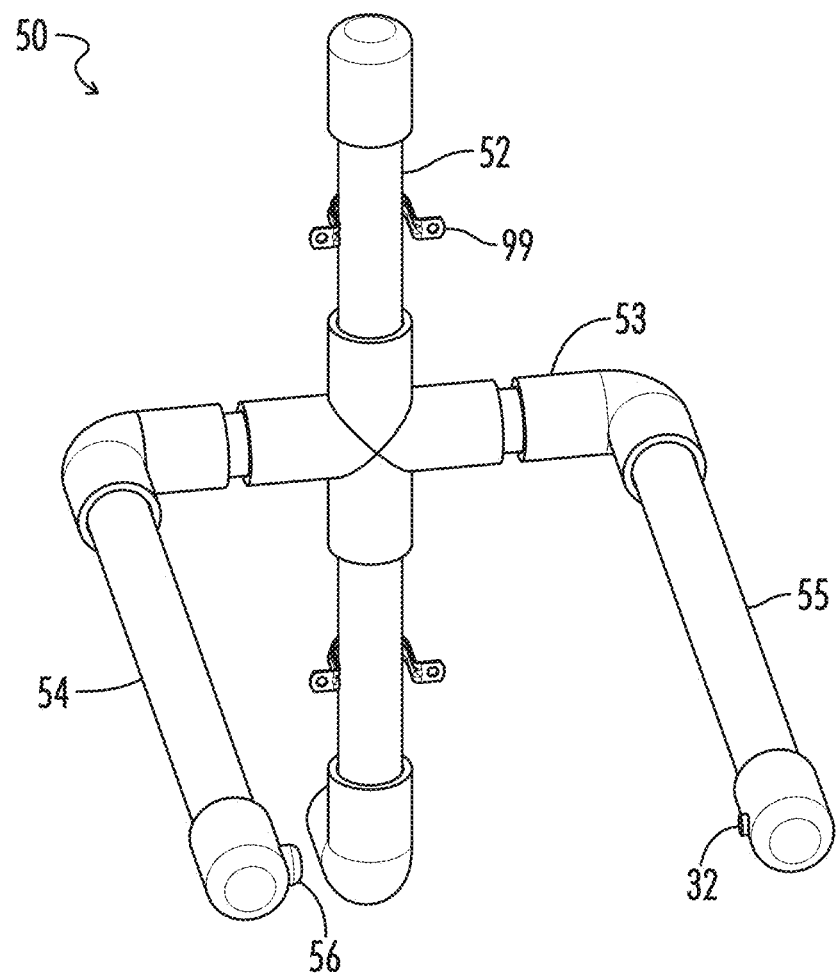
FIG. 6 is another perspective view of the sensor apparatus of FIG. 2.
Figure 7:
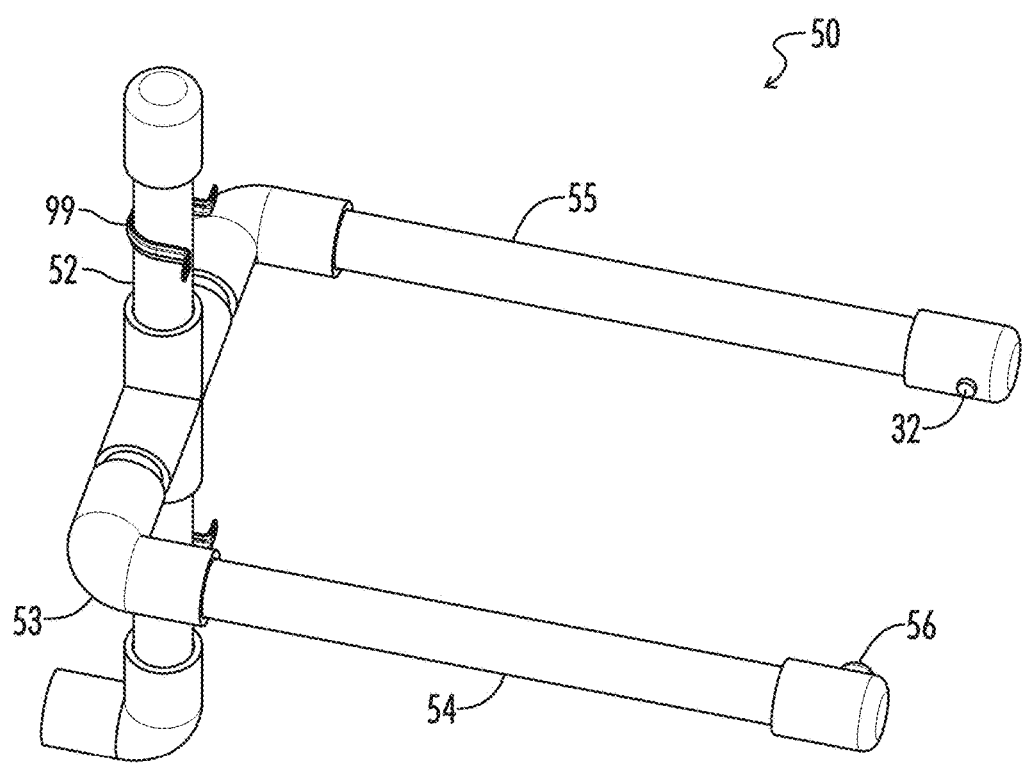
FIG. 7 is another perspective view of the sensor apparatus of FIG. 2.
Figure 8:
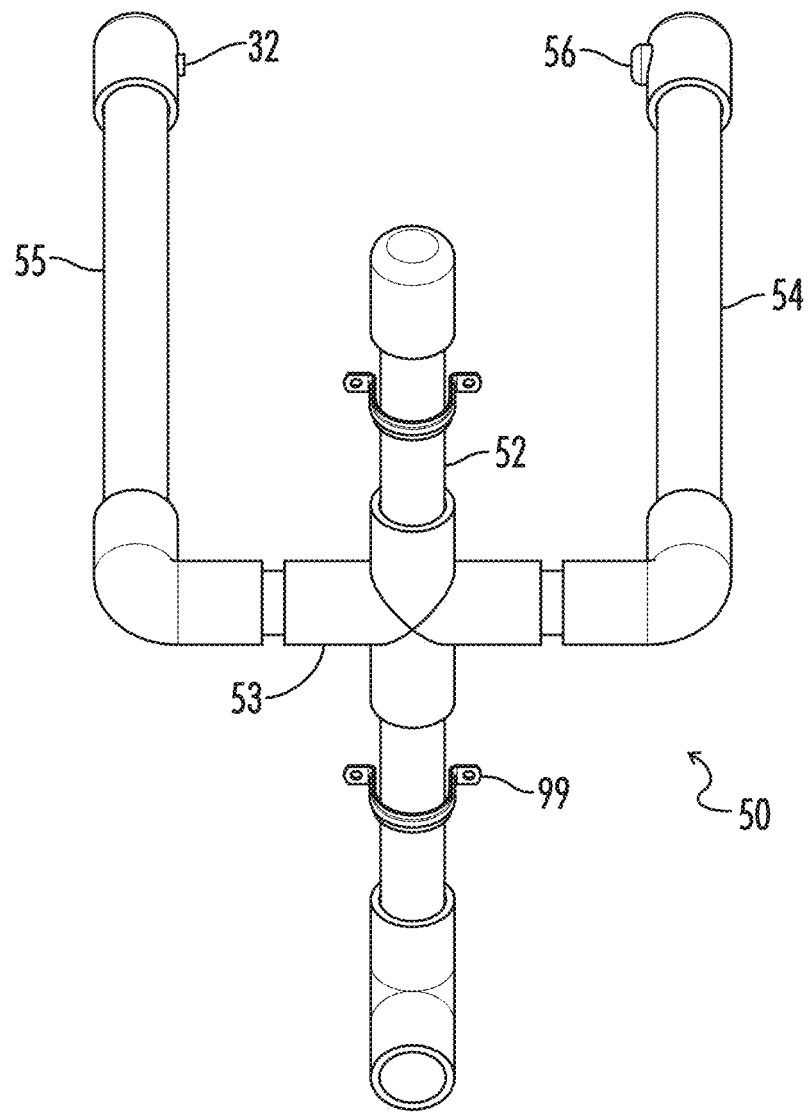
FIG. 8 is another perspective view of the sensor apparatus of FIG. 2.
Figure 9:
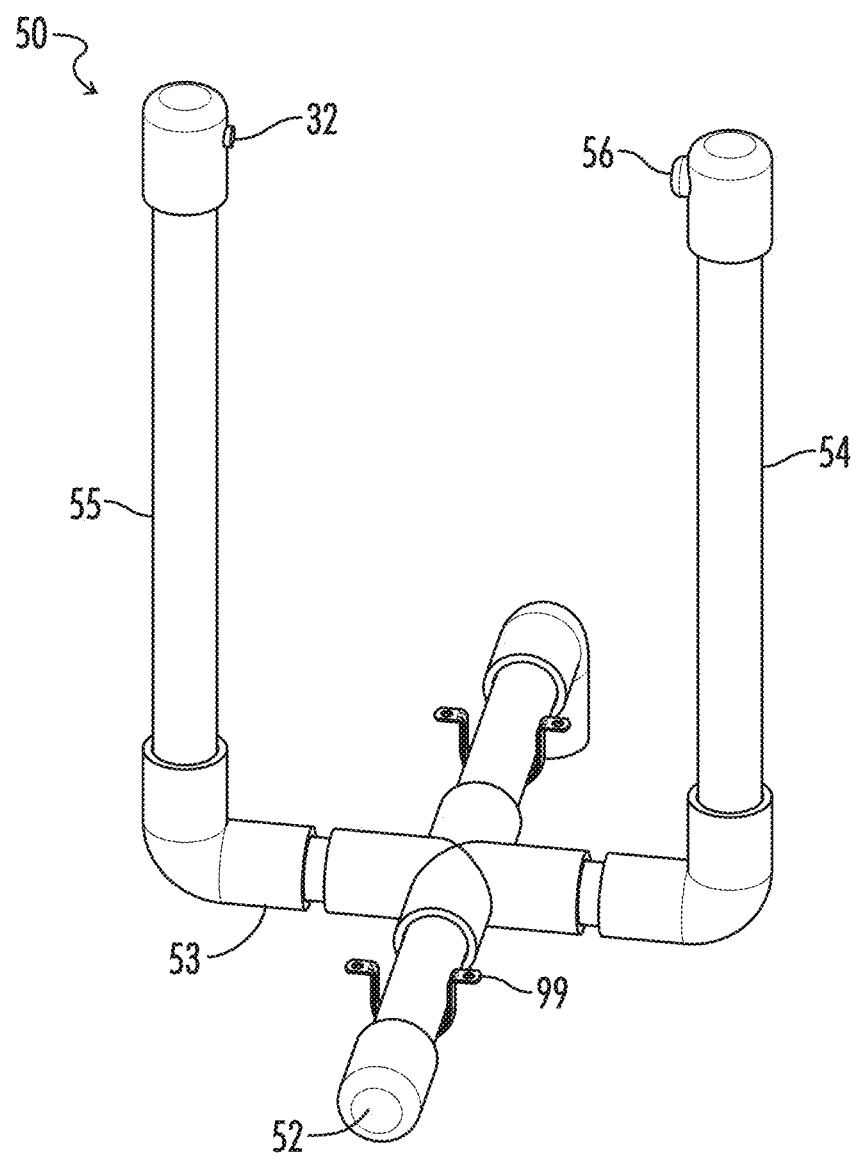
FIG. 9 is another perspective view of the sensor apparatus of FIG. 2.
Figure 10:
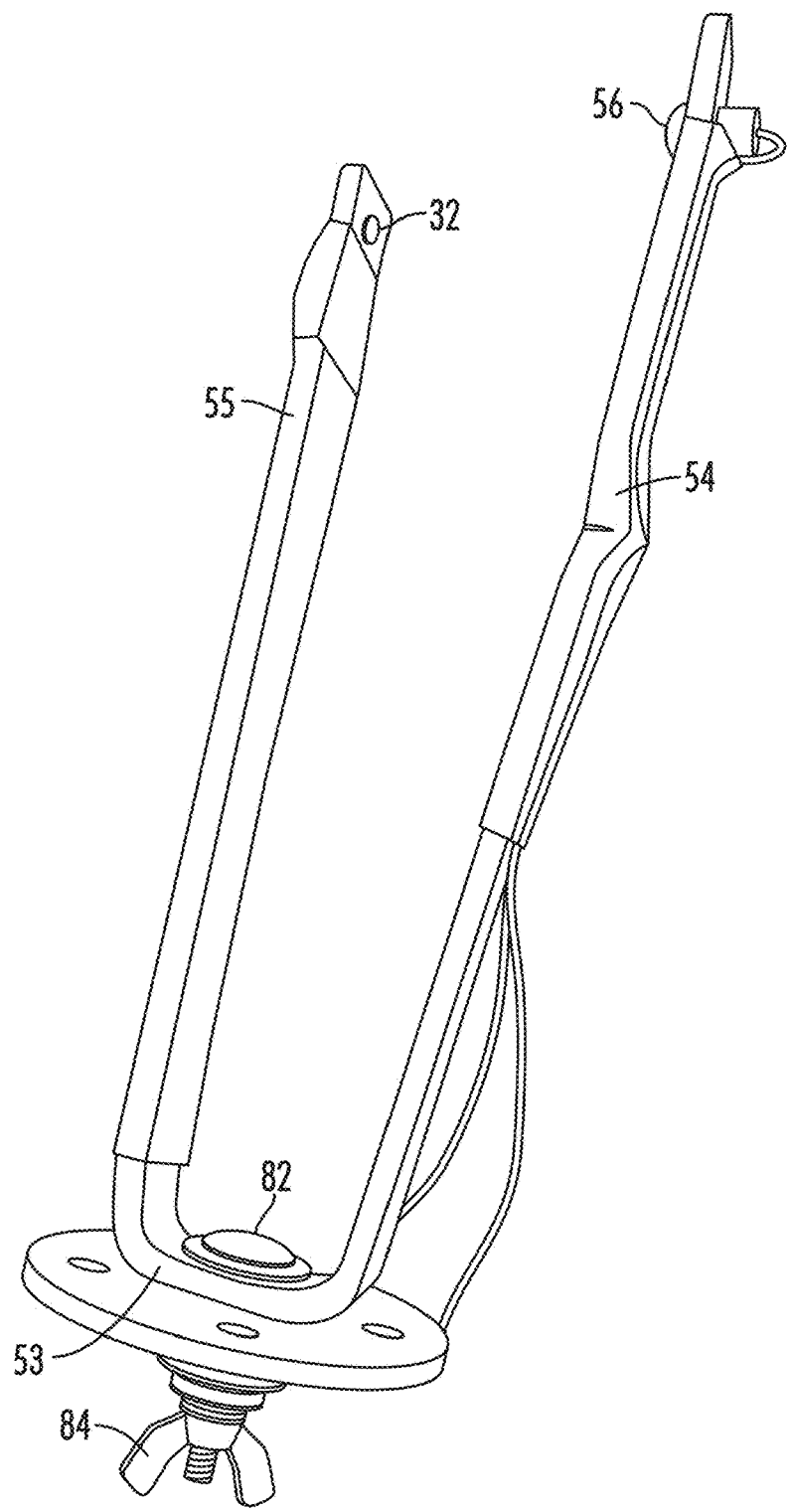
FIG. 10 is another embodiment of a sensor apparatus.
Figure 11:
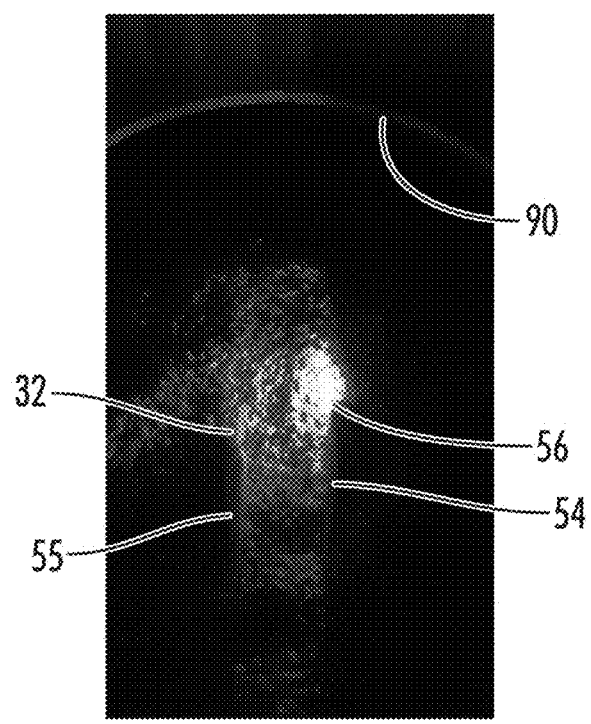
FIG. 11 is the sensor apparatus of FIG. 10 mounted in a container with a corresponding level of grain.
Figure 12:
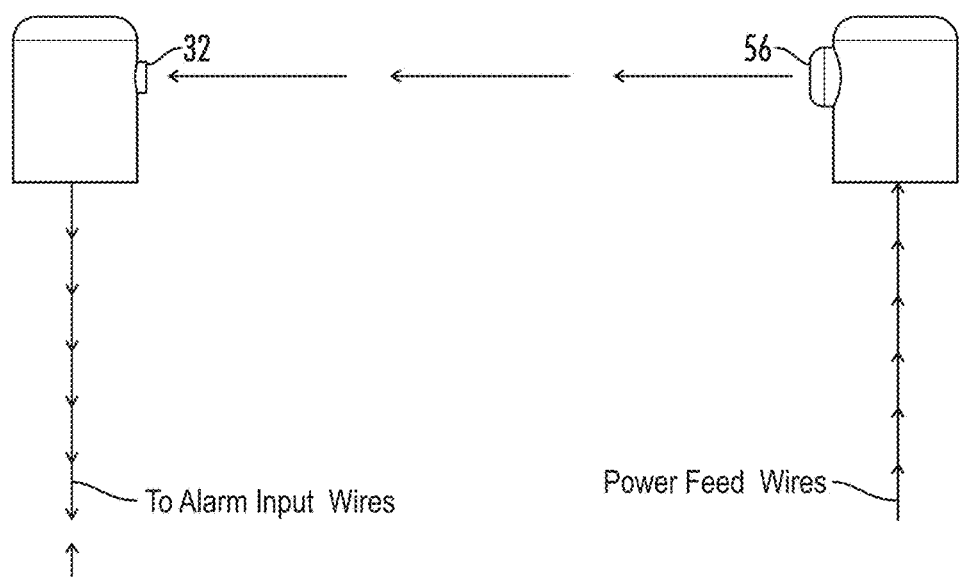
FIG. 12 is a side view of replacement ends for the sensor apparatus of FIG. 2.

In some embodiments, the sensor system 26 may include at least one sensor apparatus 50. As can best be seen in FIG. 2, the sensor apparatus 50 may be mounted at various points 94 along the side of a silo 90. Any number of sensor apparatuses 50 may be mounted to the silo 90 depending on the level of accuracy desired when monitoring the grain levels. In some embodiments, each point 94 to mount the sensor apparatus 50 may include drilling two holes 96 in the wall of the silo 90 to insert the light source member 54 and the sensor member 55, discussed in detail below. As shown in FIG. 3, the sensor system 26 may include a solar panel 92 mounted to the top or side of the silo 90. The solar panel 92 may provide some or all of the energy required to run the sensor system 26.

Turning now to an embodiment as represented for example in FIGS. 4-9, the sensor apparatus 50 may include a housing 52. The housing 52 may be made of any appropriate material including, but not limited to, metals, metal alloys, polymers, composites, and the like. The housing 52 may be constructed so as to have any desirable properties including, but not limited to, static buildup resistance, heat resistance, corrosion resistance, percussive force resistance, and the like.

The housing 52 may include a mounting portion 53. The mounting portion 53 may be secured to the wall of the silo 90 in any manner known in the art including, but not limited to, screws 98, mounting brackets 99, bolts 82 and nuts 84, adhesives, welding, brazing, and the like, and any combination thereof as may be understood by one having skill in the art.

A light source member 54 may extend from the mounting portion 53. A sensor member 55 may also extend from the mounting portion 53. A light source 56 may be disposed on the light source member 54. The light source 56 may be any appropriate light source known in the art. One non-limiting example of an appropriate light source 56 is one or more light emitting diodes (LEDs). A light sensor 32 may be disposed on the sensor member 55. The light sensor 32 may be configured to receive and monitor light from the light source 56. The light source 56 may be pointed at or near the light sensor 32. When grain covers the light source 56, the light sensor 32, or both, no signal is generated. When no grain is covering the light source 56 and the light sensor 32, a signal is generated. The signal may be then be transmitted to an alarm system 30.

Figure 13:
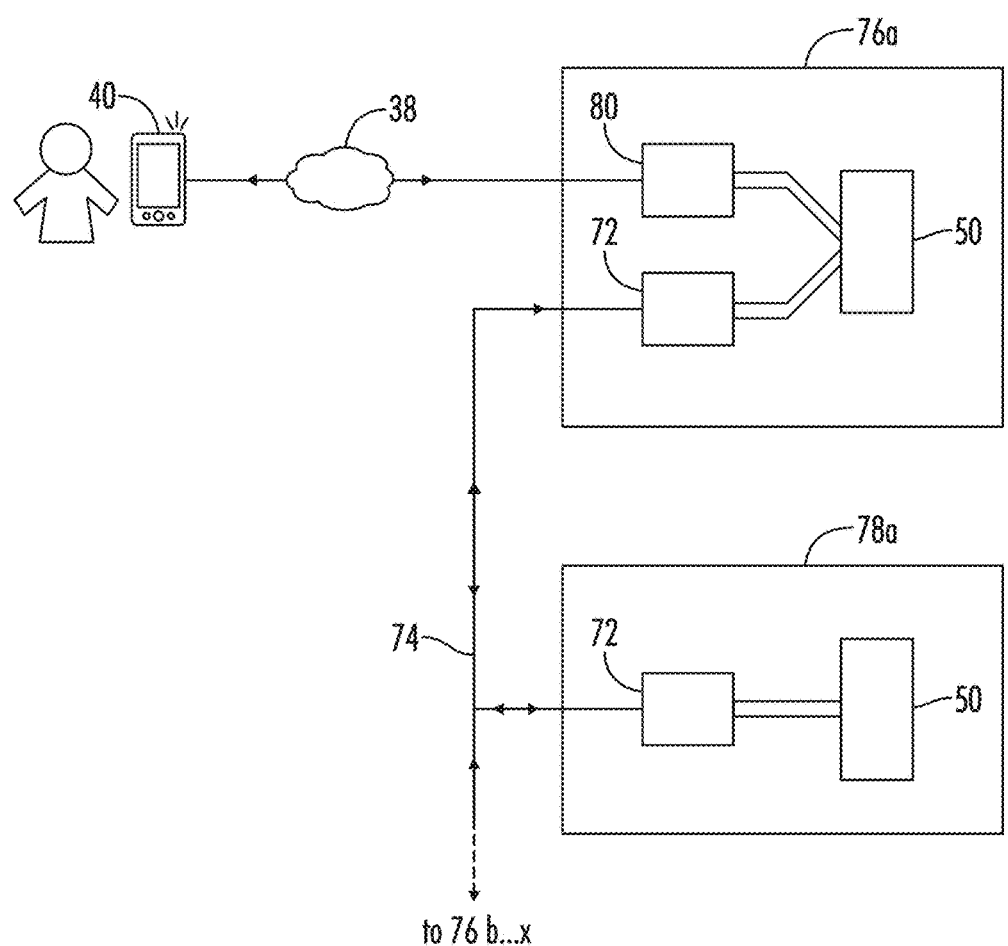
FIG. 13 is a block diagram representing an embodiment of the sensor system of FIG. 1.

Referring now to FIG. 13, some embodiments may include a plurality of sensor apparatuses 50. Each sensor apparatus 50 may include a local communications module 72 functionally linked to a local network 74. The local communications modules 72 may be linked to the local network 74 by any means including, but not limited to, both wired and wireless data transmission lines. Of the plurality of sensor apparatuses 50, at least one sensor apparatus may be a master sensor apparatus 76. The remaining sensor apparatuses 50 may be slave sensor apparatuses 78. The slaves 78 may be configured to send data to the master 76 via the local network 74. The master 76 may include a remote communications module 80 functionally linked to the user's mobile device 40 via the wireless communications network 38. The master may also include the controller 60 operatively linked to the at least one light sensor 32 and the local communications module 72 and remote communications module 80. The controller 60 may be configured to receive a predetermined silo grain level threshold data string transmitted from the user's mobile device 40 via the wireless communications network 38, generate a return data string based on grain levels sensed by the at least one light sensor 32, and transmit the return data string across the wireless communications network via the remote communications module 80 to the user's mobile device. The master 76 may also be configured to transmit data via the local network 74 to each of the slaves 78. The slaves 78 may also be configured to exchange data with the master 76 via the local network 74. Some embodiments may include the sensors and other components connected to either a mobile device or a stationary device in a machine to machine interface.

Figure 14:
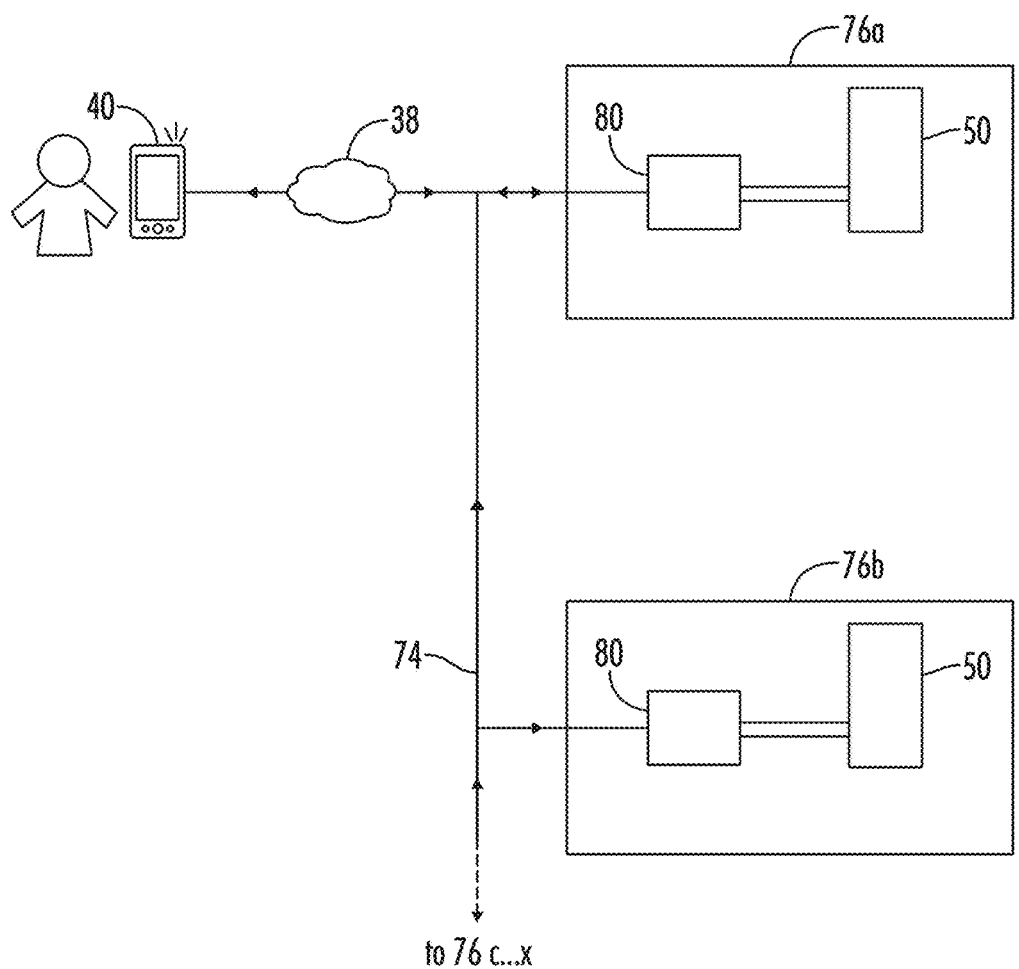
FIG. 14 is a block diagram representing another embodiment of the sensor system of FIG. 1.

As represented in FIG. 14, another embodiment may include each of the sensor apparatuses 50 configured in a manner similar to the master 76 as discussed above so as to have a plurality of sensor apparatuses 50 that may operate and communicate with the user's mobile device 40 independently.

The computer system 10 may optionally be operatively connected to one or more display devices, not depicted, capable of displaying at least one condition as determined by the one or more sensor systems. The display device may be further configured to display notifications and calibration settings.

The alarm system 30 may be comprised of one or more light sensors 32 effective to determine the level of grain in the silo. In certain embodiments, the light sensors 32 may be wired, in series or in parallel, to allow deployment of the sensors across the height of the silo. In alternative embodiments, the light sensors 32 may be wireless such that each sensor wirelessly communicates with the alarm system control unit 30. In an embodiment, the light sensors 32 may be operatively connected directly to the computer system 10. In an alternative embodiment, the alarm system 30 may be contained within or be the same system as the computer system 10.

The computer system's CPU 12 may execute the software instructions 16 stored upon the memory medium 14 to direct the performance of monitoring conditions of the silo 90 via the sensors 32. In a preferred embodiment, one or more thresholds 34 may be stored upon the memory medium 14 of the computer system 10. The thresholds 34 may relate to grain level conditions as determinable by the sensor systems 26. For example, thresholds may exist for grain levels, moisture, and the like, and temperature thresholds may exist for atmospheric temperature as measured by degrees Fahrenheit, Celsius, or Kelvin.

In certain embodiments, thresholds 34 may exist for other atmospheric conditions dependent upon the configuration and type of sensors attached. For example, a maximum threshold may exist for humidity where a relative humidity detector is one of the communicatively coupled sensor devices 26. Thresholds may exist as minimum or maximum floors or ceilings, and multiple thresholds may exist for a single measurement; for example, for the determination of temperature, a minimum threshold may be set and a maximum threshold may be set. Thresholds may be set to levels associated with ranges of positive environmental factors, such that environmental factors that exceed a maximum or minimum threshold are indicative of an environment that may be detrimental to the quality of the grain. The thresholds may be predetermined or may alternatively be specified by the user.

The computer system 10 may be further configured to generate an alert when one or more sensor systems 26 indicate a condition at or in excess of a stored threshold 34. In one embodiment, the computer system 10 may be operatively connected to a communications modem 36 capable of connecting the computer system 10 to a communications network 38. When an alert is generated, the computer system 10 may send the alert via the communications network 38 to a wireless user mobile device 40. In a preferred embodiment, the computer system 10 may generate an SMS message subsequently delivered to a user's cell phone 40.

However, other notification formats may be used, such as push notification, radio transmission, e-mail, phone call, and the like.

In certain embodiments, the computer system 10 may aggregate preferred responses in accordance with the software instructions 16 to incorporate into or send tangential to the alert. For example, for an alert associated with the grain level having fallen below the threshold value of 25%, the computer system 10 may determine via the software instructions 16 that the current detected grain level at 10% is associated with a preferred response of engaging the grain loading drive mechanism 20 at a certain speed for a defined period of time. The computer system 10 may, in addition to sending an alert to the user's mobile device 40 that the grain level is currently below the specified threshold, suggest one or more of the preferred responses for user selection. The user may then respond via the mobile device 40 to the computer system 10 by selecting one of the preferred responses and transmitting the response across the communications network 38 back to the computer system 10.

In an embodiment, the user may reply to the initial SMS message with a numeric code associated with a preferred response. Upon receipt of the response, the system may perform upon the response in accordance with the software instructions 16. Continuing the aforementioned example, the computer system 10 may send an alert that the grain level is at 10% and is 15% below the threshold value. The system may also send a recommended action of engaging the grain loading drive mechanism 20 for a predefined amount of time. The user may select upon his mobile device 40 to either take no action, to engage in the recommended action, or to take a different user-specified action, each action associated with a certain response code, keyword, or phrase to be transmitted back to the system. For example, if the aforementioned examples are numbered 1, 2, and 3 respectively, the user may send an SMS message reply with the content of "2," and the computer system 10 will engage software instructions 16 effective to engage the grain loading drive mechanism 20 via the one or more relays 24.

In another embodiment, the computer system 10 and software instructions 16 may be configured to receive a command from the user's mobile device 40 irrespective of the generation of an alert. A command may be embodied as a code, phrase, programming string, or other form of communication transmissible across the communications network 36 and capable of uniquely identifying one of a plurality of executable activities. Such activities may include, but are not limited to; retrieving and replying with information pertaining to one or more of the associated grain loading drive mechanisms 20; retrieving and replying with information collected from the one or more sensor systems 26; activating one or more of the associated grain loading drive mechanisms; deactivating one or more of the associated grain loading drive mechanisms; activating one or more of the associated grain loading drive mechanisms in accordance with specific parameters; activating one or more of the associated sensor systems 26; deactivating one or more of the associated sensor systems 26; activating one more of the associated sensor systems 26 in accordance with specific parameters; adding, removing, or changing alert threshold values; and sending a reorder alert via the internet, text message, push notification, phone call, and the like.

In a further embodiment, the computer system 10 may determine whether or not to execute a received command in accordance with parameters specified in the software instructions 16. The computer system 10 and software instructions 16 may refuse to execute a command where the sensor systems 26 indicate an ambient state or condition or where the one or more relays 24 of the associated grain loading drive mechanisms are set to a certain configuration. To posit examples: the computer system 10 may refuse to execute a command to activate the grain loading drive mechanism 20 where the grain loading drive mechanism is already activated; the computer system 10 may refuse to execute a command to deactivate the grain loading drive mechanism when the grain loading drive mechanism is already deactivated; and the like.

The software instructions 16 may preferably be configured to enable the computer system to identify a plurality of conditions where commands may be improper, superfluous, or detrimental to the system, contents, and/or product and subsequently reject those commands wherein the computer system 10 conditions have been met. Upon refusing a received command, the computer system 10 may generate an alert to send to the user's mobile device 40 to notify the user that the command has been refused. The alert may preferably include information pertaining to why the command has been refused, such as indicating the state of a grain loading drive mechanism or condition of the silo contents as monitored by the sensor systems 26.

In still other embodiments, the computer system 10 may proactively engage upon one or more recommended actions automatically and without user selection. For example, where a grain level has fallen below the threshold, the computer system 10 may automatically activate the grain loading drive mechanism 20 and notify the user that the grain loading drive mechanism has been activated. In a further embodiment, the user may be able to override the automatic determination and, in accordance with the example, turn off the grain loading drive mechanism. Additionally or alternatively, the computer system 10 may automatically send a grain reorder to a previously designated grain supplier when the grain level has fallen below the threshold. Upon the automatic reorder, the computer system 10 may also notify the user that the grain reorder has been sent. In a further embodiment, the user may be able to override the automatic determination and, in accordance with the example, cancel the grain reorder.

Figure 15:
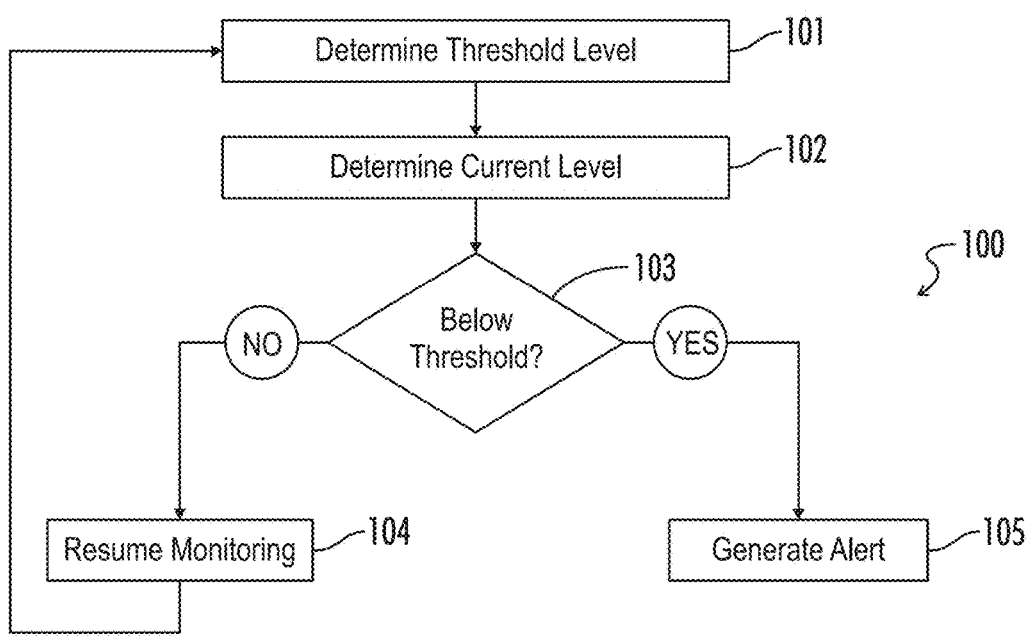
FIG. 15 is a flowchart representing an embodiment of a method for monitoring levels of grain in a silo in accordance with the present disclosure.

FIG. 15 is an embodiment of a method for monitoring grain levels in a silo in accordance with the present disclosure. The method 100 begins at step 101 when the computer system determines a threshold value for the minimum level of grain. The threshold value may be stored in memory and may be preconfigured or otherwise specified by a user. In step 102, the system determines the current level of grain in the silo, which is detected by monitoring if the at least one light sensor is sensing light from the corresponding light source. In certain embodiments, multiple sensors may be used, whereupon the determination may be made for each of, a subset of, or all sensors in the sensor array.

In step 103, the system compares the grain level value to the threshold value. If the grain level value is not below the threshold value, then the system proceeds to step 104 and continues its monitoring state. The monitoring state, wherein method 100 is performed, may be continuous or periodic, such that steps 101-103 are performed either continuously or intermittently at scheduled intervals. If the grain level value falls below the threshold value, then the system proceeds to step 105 and generates an alert. Upon generation of the alert, the system may resume its monitoring state and repeat method 100. In certain embodiments such as when the method is performed continuously, after an initial alert is generated, the system may implement a grace period before issuing subsequent alerts to allow for grain level values to normalize, thereby preventing a continuous flood of generated alerts for the duration that the grain level is below the threshold.

Method 100 may be similarly performed for other atmospheric factors as measured by other sensors with threshold values assigned to each. For example, separate alerts may be generated (S105) for determination that an atmospheric heat threshold has been exceeded, that an atmospheric cold threshold has been exceeded, that an atmospheric humidity threshold has been exceeded, and so on.

Figure 16:
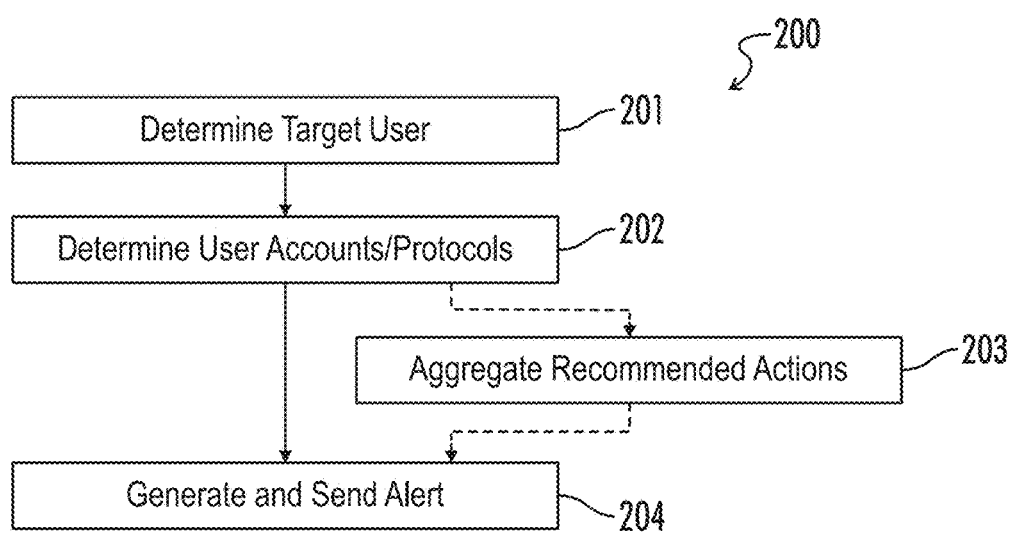
FIG. 16 is a flowchart representing an embodiment of a method for generating a wireless alert in accordance with the present disclosure.

FIG. 16 describes an embodiment of a method for generating an alert on a wirelessly connected device in accordance with this disclosure and the alert generation step described in FIG. 15. The method 200 begins at a first step 201 wherein the system determines a target user to receive said alert. In certain embodiments, more than one target user may be determined to receive an alert. In additional embodiments, a target user may be associated with one or more communications accounts. For example, a user may have an associated cell phone number, e-mail address, application user ID, and so forth. In step 202, the system then determines which target users and which target user accounts to select for receipt of the alert.

The system may also perform step 203, wherein the system aggregates one or more actions stored in association with the alert. For example, for an alert that the grain level has fallen below the threshold value, the system may aggregate the options of: turn on grain loading drive mechanism; reorder grain from supplier; turn on grain loading mechanism and reorder grain from supplier; and do nothing. Alternatively, the system may aggregate the options of: turn on grain loading drive mechanism until grain level reaches 25%; turn on grain loading drive mechanism until grain level reaches 50%; turn on grain loading drive mechanism until grain level reaches 75%; and do nothing.

In step 204, the system generates an alert and sends it to a mobile device associated with a target user by means of a communications network. In certain embodiments, multiple mobile devices associated with one or more target users may be selected for receipt. For example, an alert may be sent to one or more target users' cell phone numbers, e-mail addresses, messaging platforms, and the like. Alerts may take the form of an SMS message, MMS message, e-mail message, push notification, SMTP, instant message, and like forms of electronic communications. In certain embodiments, alerts may include a description of the metric failing to meet the associated threshold, the current atmospheric measure triggering the alert, the amount by which the value has fallen below or exceeded the threshold, and/or possible responses.

In preferred embodiments, the system may include with the alert, or alternatively send subsequent to the alert, the one or more aggregated actions determined in step 203 for user selection. In certain embodiments, the aggregated actions may include the display of a picture or video of the grain or silo at the time of, or at a time immediately following, the generation of the alert. The system may alternatively automatically deliver the picture or video automatically with the alert. In an embodiment, the alert, conditions, picture, and/or video may be sent to multiple users. In said embodiment, the system may further enable the multiple users to monitor conditions and interact with one another such as through a chat room, voice conference call, and the like.

Figure 17:
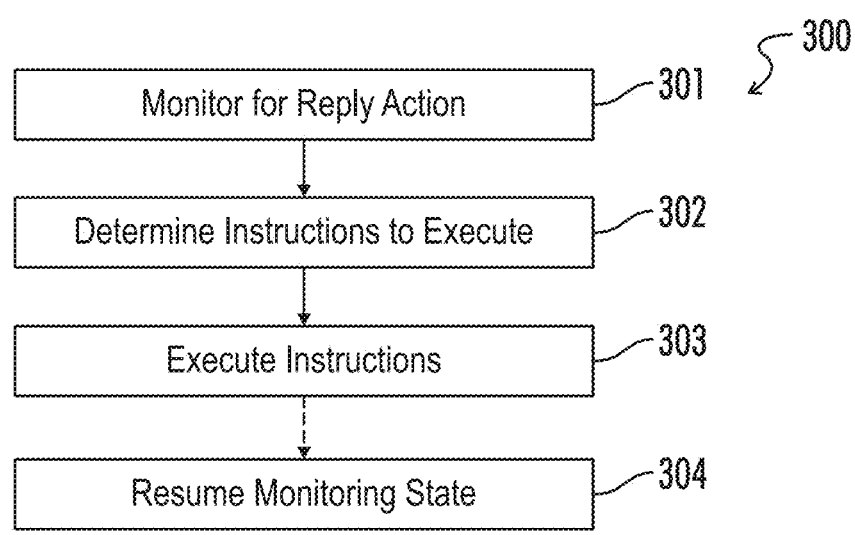
FIG. 17 is a flowchart representing an embodiment of a method for executing action instructions in accordance with the present disclosure.

FIG. 17 is an embodiment of a method for executing a grain loading drive mechanism and/or grain reordering instructions in accordance with the present disclosure and the wireless alert generation method described in FIG. 16. The method 300 begins at step 301 where the system monitors for a reply action from the target user following the generation and sending of an alert as described in the method embodied in FIG. 16. A reply may be sent wirelessly to the system in accordance with the same communications network protocol used to send the alert. For example, an SMS or MMS message may monitor for an SMS response from the cellular number messaged; an e-mail message may await a reply with certain body text; and so forth. The user may select a reply action from one of a plurality of proposed actions as determined in step 203. For specific example, where a target user has received the alert and proposed actions: "ALERT: grain levels in Silo 3 @ 10%; −15% below 25%; (1) engage grain loading drive mechanism until grain levels reach 25%, (2) engage grain loading drive mechanism until grain levels reach 50%, (3) reorder grain from supplier, (4) do nothing; reply with choice of action;" the target user may reply to the message with a body text of "1," "2," "3," "4," "1 and 3," or "2 and 3." each number corresponding to each respective action proposed, such that "1" will engage the grain loading drive mechanism until grain levels reach 25%, "2" will engage the grain loading drive mechanism until grain levels reach 50%, "3" will transmit a grain reorder to the predetermined supplier, "4" will do nothing, and the combinations of numbers as mentioned above will perform a combination of the corresponding actions. In certain embodiments and in reference to FIG. 16, the user may define a reply action not determined in step 203 by means of an API function. For example, a response of: "grainloader 75%" in the message reply body may result in turning on the grain loading drive mechanism until the grain level reaches 75%.

Upon receiving the target user's reply action, the system proceeds to step 302 and determines executable instructions associated with the reply action. In preferred embodiments, the executable instructions may be electronic impulses or signals sent to certain switches, relays, or computer inputs of attached grain loading drive mechanisms for purposes of activating or deactivating said grain loading drive mechanisms. Alternatively, associated instructions may not activate grain loading drive mechanisms and may instruct the system not to generate alerts for a certain period of time. In certain embodiments, instructions may also or independently affect the turning on of a video or camera system within or facing the silo and the subsequent capture of video or images from said camera.

In an alternative embodiment of step 302, the system may compare the reply action with preconfigured parameters and determine from the comparison whether to execute the instructions in accordance with step 303 or to refuse to execute the instructions. The preconfigured parameters may specify not to execute certain reply actions when certain states and/or conditions are present. Conditions may include ambient conditions as determined by associated sensors; operating states of the grain loading drive mechanisms; non-ambient conditions determined from non-sensor sources, such as for example time of day determined from the computer system or local weather determined from a communications network-based source; and the like. The system may also refuse to execute a reorder from supplier command if, for example, insufficient funds are present in the associated account. In the event of a refusal, the system may optionally send an alert to the target user.

In step 303, the system executes the determined instructions associated with the user's reply action. In an exemplary embodiment, a reply action associated with instructions to enable a grain loading drive mechanism may affect output to a relay that activates one or more grain loading drive mechanisms associated with the silo for a determined duration of time and then after such duration may affect a second output to said relay that deactivates the one or more grain loading drive mechanisms previously activated. In a second exemplary embodiment, the system may activate one or more grain loading drive mechanisms until the grain level in the silo has exceeded a certain threshold as determined by the one or more light sensors. In other exemplary embodiments, reply actions may include the taking and sending of a photograph or video of the interior and/or exterior of the silo to the user; activating a heating element until a threshold temperature is achieved; activating a dehumidifying system until a threshold humidity is achieved; and so forth. The system may, subsequent to the execution of instructions, optionally resume monitoring conditions in step 304 as per method 100 embodied in FIG. 15 above.

The previous detailed description has been provided for the purposes of illustration and description. Thus, although there have been described particular embodiments of the present disclosure of a new and useful invention, it is not intended that such references be construed as limitations upon the scope of this invention except as set forth in the following claims.

What is claimed is:

1. A system for regulating grain levels in a storage container, the system comprising:
   a grain loading drive mechanism configured to transport grain into the storage container;
   a sensor system disposed on a side of the container comprising at least one sensor apparatus;
   the sensor system communicatively connected to a controller to direct performance of operations comprising:
      monitoring a level of grain in the container with the at least one sensor apparatus;
      comparing the monitored level to a predetermined level threshold;
      for monitored levels below the predetermined level threshold, generating and forwarding an alert by means of a wireless communications network to a user's mobile device;
      monitoring for a user command received from the user's mobile device via the wireless communications network;
      for the user command, determining associated instructions to be executed;
      monitoring one or more ambient conditions and operating states of the grain loading drive mechanism; and
      automatically determining, based at least in part on the monitored one or more ambient conditions and operating states, whether to reject the user command and not execute the associated instructions.

2. The system of claim 1, wherein the at least one sensor apparatus comprises:
   a housing including:
      a mounting portion;
      a light source member extending from the mounting portion; and
      a sensor member extending from the mounting portion;
   at least one light source disposed on the light source member;
   at least one light sensor disposed on the sensor member, the light sensor configured to receive and monitor light from the light source; and
   wherein at least one of the light source and the light sensor are configured to be covered by the grain inside the container when the grain reaches a corresponding level.

3. The system of claim 2, wherein the at least one sensor apparatus further comprises a temperature sensor.

4. The system of claim 3, the controller further directing the performance of operations comprising:
   monitoring a temperature within the container via the temperature sensor;
   comparing the monitored temperature to one or more predetermined temperature thresholds; and
   for monitored temperatures exceeding or falling below the one or more temperature thresholds, generating and forwarding an alert by means of the wireless communications network to the user's mobile device.

5. The system of claim 2, wherein the at least one sensor apparatus further comprises a humidity sensor.

6. The system of claim 5, the controller further directing the performance of operations comprising:
   monitoring a humidity within the container via the humidity sensor;
   comparing the monitored humidity to one or more predetermined humidity thresholds; and
   for monitored humidity exceeding or falling below the one or more humidity thresholds, generating and forwarding an alert by means of the wireless communications network to the user's mobile device.

7. The system of claim 2, further comprising:
   a plurality of sensor apparatuses each comprising a local communications module functionally linked to a local network; and
   at least a first sensor apparatus comprising a master apparatus, a remaining one or more of the plurality of sensor apparatuses comprising slave apparatuses effective to send data to the master apparatus via the local network, the first sensor apparatus comprising:
      a remote communications module functionally linked to the user's mobile device via the wireless communications network; and
      the controller operatively linked to the at least one light sensor and the local and remote communications modules, the controller configured to
      receive a predetermined contents level threshold data string transmitted from the user's mobile device via the wireless communications network;
      generate a return data string based on contents level data sensed by the at least one light sensor; and
      transmit the return data string across the wireless communications network via the remote communications module to the user's mobile device.

8. The system of claim 7, wherein the controller of the master apparatus is further effective to transmit data via the local network to each of the slave apparatuses and the slave apparatuses are further effective to exchange data with the master apparatus via the local network.

9. The system of claim 2, further comprising:
   a plurality of sensor apparatuses, each sensor apparatus including:
      a remote communications module functionally linked to the user's mobile device via the wireless communications network; and
      a controller operatively linked to the at least one light sensor and the remote communications module, the controller effective to:
      receive a predetermined contents level threshold data string transmitted from the user's mobile device via the wireless communications network;

generate a return data string based on contents level data sensed by the at least one light sensor; and transmit the return data string across the wireless communications network via the remote communications module to the user's mobile device.

10. The system of claim 1, further comprising at least one camera configured to monitor the contents of the container.

* * * * *